US008789086B2

(12) United States Patent
McCoy et al.

(10) Patent No.: US 8,789,086 B2
(45) Date of Patent: Jul. 22, 2014

(54) METHOD AND APPARATUS FOR CONTENT PLAYBACK USING MULTIPLE IPTV DEVICES

(75) Inventors: Charles McCoy, Coronado, CA (US); Ling Jun Wong, Escondido, CA (US); True Xiong, San Diego, CA (US)

(73) Assignees: Sony Corporation, Tokyo (JP); Sony Network Entertainment International LLC, Los Angeles, CA (US)

( * ) Notice: Subject to any disclaimer, the term of this patent is extended or adjusted under 35 U.S.C. 154(b) by 163 days.

(21) Appl. No.: 13/077,525

(22) Filed: Mar. 31, 2011

(65) Prior Publication Data

US 2012/0210343 A1    Aug. 16, 2012

Related U.S. Application Data

(60) Provisional application No. 61/442,019, filed on Feb. 11, 2011.

(51) Int. Cl.
*H04N 7/16*    (2011.01)

(52) U.S. Cl.
USPC ........ 725/25; 725/9; 725/28; 725/40; 725/46; 725/88; 725/109; 725/111

(58) Field of Classification Search
USPC ................ 725/25, 40, 111, 9, 28, 46, 88, 109
See application file for complete search history.

(56) References Cited

U.S. PATENT DOCUMENTS

| 2006/0010470 A1* | 1/2006 | Kurosaki et al. ................ 725/46 |
| 2008/0200154 A1* | 8/2008 | Maharajh et al. .......... 455/414.3 |
| 2010/0027966 A1* | 2/2010 | Harrang et al. ................ 386/69 |
| 2011/0004826 A1* | 1/2011 | Cho et al. ...................... 715/716 |
| 2012/0079547 A1* | 3/2012 | Kim et al. ...................... 725/111 |

FOREIGN PATENT DOCUMENTS

| CN | 1685713 | 10/2005 |
| CN | 101945162 | 1/2011 |

OTHER PUBLICATIONS

Office Action issued in corresponding Chinese application No. 201210022990.X dated Feb. 27, 2014.

* cited by examiner

*Primary Examiner* — Jivka Rabovianski
(74) *Attorney, Agent, or Firm* — Frommer Lawrence & Haug LLP; William S. Frommer; Paul A. Levy

(57) ABSTRACT

An apparatus and method for resuming playback of media content from more than one Internet Protocol Television (IPTV) device. The playback of a media asset or media content typically contains an asset ID and a start time. Based on the architecture of a second display device (e.g., a second IPTV device) the IPTV system determines the identity of an account and its associated IPTV devices. When a user pauses an asset, the system sends the asset identification (ID) and the stop time to a server operatively coupled to the system. The next time (within a predefined duration) the user requests the same asset ID, the pause time and the asset ID are returned. Using the pause time and the asset ID, the user can resume playback of the asset.

14 Claims, 6 Drawing Sheets

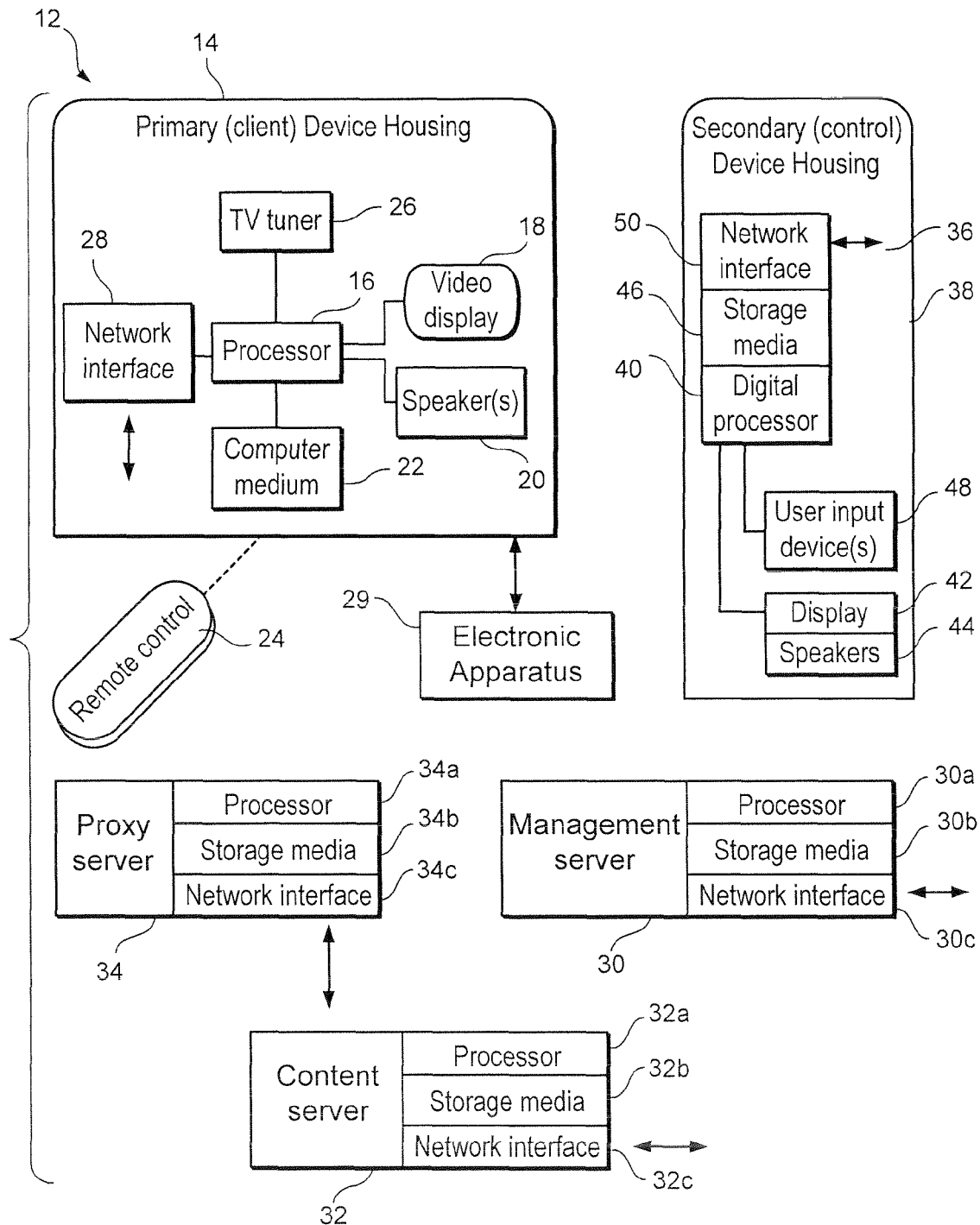
F I G. 1

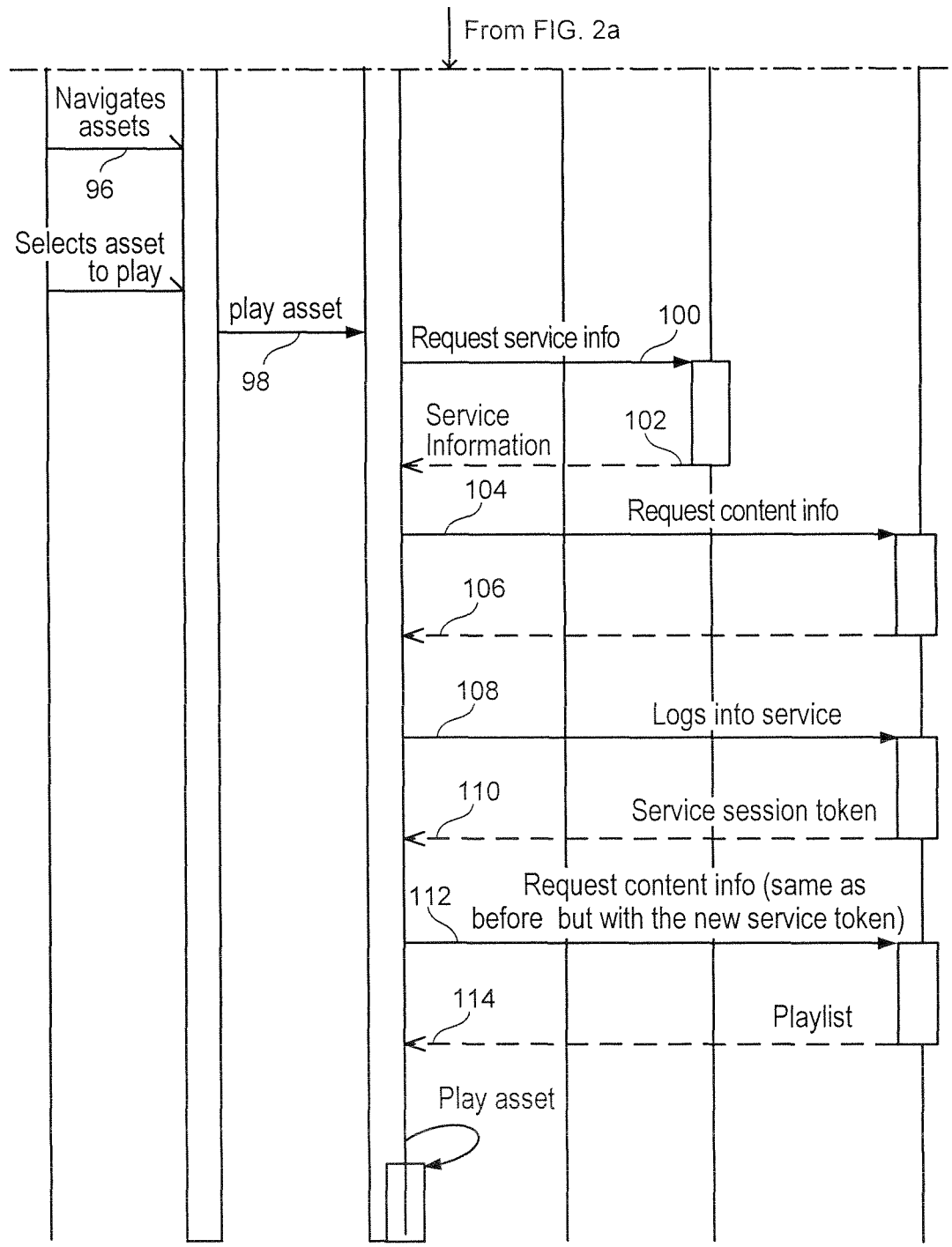
F I G. 2b

METHOD AND APPARATUS FOR CONTENT PLAYBACK USING MULTIPLE IPTV DEVICES

CLAIM TO PRIORITY

This application claims the benefit of previously filed provisional application U.S. Ser. No. 61/442,019, filed on Feb. 11, 2011, which is hereby incorporated by reference in its entirety herein.

BACKGROUND

1. Field of the Invention

This invention relates generally to a system and method of controlling one device capable of accessing Internet Protocol Television (IPTV) using a second device and more specifically resuming playback of media content using more than one IPTV device.

2. Background Discussion

IPTV is capable of receiving services delivered using the architecture and networking methods of the Internet Protocol Suite as well as services delivered using a broadcasting network. IPTV services include, for example, live television, time-shifted programming, video on demand (VOD), and on-line transactions.

SUMMARY

One embodiment of the present invention is directed to an apparatus and method capable of resuming playback of media content from more than one IPTV device. The playback of a media asset or media content typically contains an asset ID and a start time. Based on the existing architecture of a second display device (e.g., a second IPTV device) a system of the present invention can determine the identity of an account and its associated IPTV devices. When an IPTV client pauses an asset, the system sends the asset identification (ID) and the stop time to a server operatively coupled to the system. The next time (within a predefined duration) the associated IPTV client associated with an account requests the same asset ID, the pause time and the asset ID are returned. Using the pause time and the asset ID, the client can resume playback of the asset.

Another embodiment of the present invention is directed to a server system that has a data base and a network interface. The database is used to store a list of IPTV devices associated with each of one or more authenticated users and a content list comprising asset identification information for each of the listed IPTV devices. The network interface includes receiving: user authentication information; asset identification information; and an interruption command that includes offset information that represents a time interval from a first point of an asset. When the server receives an execution command specifying the asset identification information, the server sends content information for execution as a function of the offset information.

Another embodiment of the present invention allows playback of a real-time event when the user moves to a different time zone during the event. Thus, a user begins viewing an event in one time zone and wishes to resume viewing the event at a later time in a different time zone. The user can stop playing the content of the real time event in one time zone and resume playing the content of the event in a second time zone (assuming the event is still occurring). Thus, the server receives asset identification information from a time zone (e.g., PST) that differs from the time zone (e.g., EST) from which the interruption command is received. The server determines new offset information as a function of the time zone from which the interruption command was received (e.g., EST) and the time zone from which the asset identification information was received (PST), and the server sends content information for execution as a function of the new offset information.

Other embodiments of the present invention include the methods described above but implemented using apparatus or programmed as computer code to be executed by one or more processors operating in conjunction with one or more electronic storage media.

BRIEF DESCRIPTION OF THE DRAWINGS

To the accomplishment of the foregoing and related ends, certain illustrative embodiments of the invention are described herein in connection with the following description and the annexed drawings. These embodiments are indicative, however, of but a few of the various ways in which the principles of the invention may be employed and the present invention is intended to include all such aspects and their equivalents. Other advantages, embodiments and novel features of the invention may become apparent from the following description of the invention when considered in conjunction with the drawings. The following description, given by way of example, but not intended to limit the invention solely to the specific embodiments described, may best be understood in conjunction with the accompanying drawings, in which:

FIG. 1 shows a block diagram of one embodiment of the present invention.

DETAILED DESCRIPTION

Figure 2A:
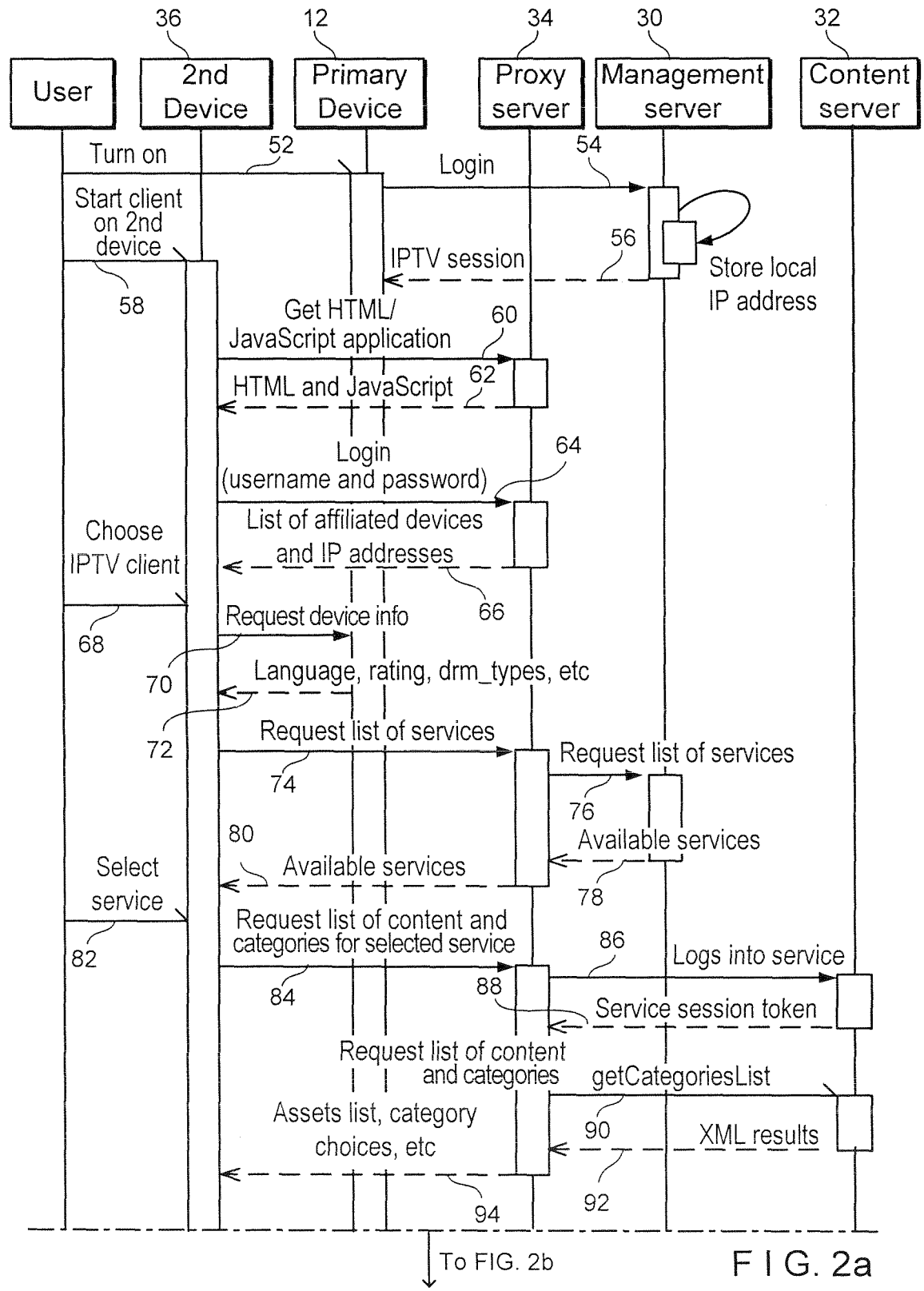
FIG. 2 shows a series of steps according to an embodiment of the present invention.

It is noted that in this disclosure and particularly in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. These and other embodiments are disclosed or are apparent from and encompassed by, the following description. As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Furthermore, the detailed description describes various embodiments of the present invention for illustration purposes and embodiments of the present invention include the methods described and may be implemented using one or more apparatus, such as processing apparatus coupled to electronic media. Embodiments of the present invention may be stored on an electronic media (electronic memory, RAM, ROM, EEPROM) or programmed as computer code (e.g., source code, object code or any suitable programming language) to be executed by one or more processors operating in conjunction with one or more electronic storage media.

Embodiments of the present invention may be implemented using one or more processing devices, or processing modules. The processing devices, or modules, may be coupled such that portions of the processing and/or data manipulation may be performed at one or more processing devices and shared or transmitted between a plurality of processing devices.

An IPTV device may be used to control home appliances through IPTV. These home appliances include, for example, video players, game players, home theater systems, digital video recorders, air conditioners, and etc. Household electrical appliances and audio-visual apparatuses, such as video cassette recorders (VCRs), televisions, air conditioners, and lighting apparatuses, may be furnished with remote controls. These remote controls each have operation units and functions specific to each apparatus. In order to control home appliances, a dedicated remote control may be placed in a vicinity of an associated home appliance. IPTV provides the ability to integrate different functions or different applications into a single control device to control multiple appliances. This single control device may be a smart phone, a digital personal assistant, a personal computer, lap top computer, tablet, or other device with adequate processing and/or storage capabilities. The single control device may transmit control signals through a public network or Internet or other network of operatively coupled computers, or processing devices or modules to an IPTV device, which uses the control command to control home appliances.

An IPTV device can access a vast pool of contents provided by numerous content providers. The IPTV device may also be used to control further distribution of content that has been provided by a third party to the IPTV device so that unauthorized access is prevented. Typically, IPTV is controlled by a single input device and has a single display device. As a shared device that is viewed by several users it is helpful to permit this sharing without excessively raising hardware costs.

Accordingly, a method is provided to enable a user browsing content on a second device to have their selection played by a first device. The user can then continue to browse the content on any number of second devices without interrupting the content that is playing on the first device. The first device may be an IPTV. The second device may be another electronic device. The method include an architecture design and implementation that allows a user to navigate, browse, and search content on a second device that may be a consumer electronic device such as a Sony Ericsson smart phone, VAIO® PC, VAIO® laptop, Mylo®, personal computer, or other apparatus with sufficient processing and storage capability, or any device with a web browser. Concurrently, while a user is using the first device, another user can perform these activities on the second device and send a media selection to the first device of the user's choice for playback.

A second device, also referred to as a secondary device and/or a secondary display device, herein, performs manipulating functions such as searching, content playback, browsing (when operable with a web browsing application) and may act as a visual aid to the IPTV. Utilization of a secondary device is a low cost solution which opens up a huge window of business and technical opportunities when used with one or more IPTV devices. It is a favorable complement to the IPTV because the secondary device has strengths in data entry, processing power and user experience in content management. Thus, users will be able to use their personal devices, such as a cellphone, to browse content in their own language, perform data entry, search for content, manage their content, perform transactions and personalize their experience without disturbing the big screen of a first device. Users only send the content for playback on the IPTV when they are ready to watch it; and playback of proprietary content does not occur on the non-authentic device so security risks are minimized. The program may be written in any suitable language, such as JavaScript, HTML, or other programming language with the desired functionality, which can be loaded by any device with a browser, hence not limited to only a small set of compatible devices.

An IPTV system typically includes an IPTV client device and an IPTV client processor for controlling a video display to present content thereon. The system also includes one or more second devices including a control processor and a management server communicating with the IPTV client device over the Internet. The management server and IPTV client communicate with at least one content server such that the content server provides audio video content to the IPTV client for presentation of the content on the video display of the IPTV client. The system further includes a proxy server communicating with the management server and the second device. The IPTV client sends login information to the management server which returns to the IPTV client an IPTV session token, that is subsequently presented by the IPTV client to a content server to obtain content from the content server. The management server receives and stores a local IP address of the IPTV client, which may include, for example Uniform Resource Indicator (URI) or Uniform Resource Locator (URL) or a network location or network address. The management server can also store an external IP address, which allows communication from a secondary device, which is outside the network, to the IPTV device. Responsive to the second device sending a request to the proxy server for an executable utility, the proxy server returns the utility to the second device. Further, the second device, executing the utility, prompts a user to input to the second device login information. The proxy server, responsive to reception of correct login information from the second device, returns the local IP address of the IPTV client to the second device. The second device uses the local IPTV address to access the IPTV client directly to request information about the IPTV client, which information is returned from the IPTV client to the second device such that the local address of the IPTV client need not be globally addressable. Also the second device sends the information about the IPTV client to the proxy server, requesting a list of services available to the IPTV client from one or more content servers. The proxy server relays the request for a list of services to the management server, which returns the list to the proxy server, with the proxy server in turn sending the list to the second device for presentation of information on the video display. Responsive to a user selection of an element on the list, the second device sends a request for a software asset corresponding to the element to the proxy server. The proxy server requests a service login of the content server providing the asset, and the content server provides to the proxy server a list of assets or categories or services which relays the list to the second device, which is presented on the video display of the second device so that the user can navigate to enter a selection. Responsive to the selection the second device sends a command to the IPTV client to play the selection.

Embodiments include the IPTV client requests of the management server information about the selection received from the second device. The information is returned from the management server to the IPTV client device to enable the IPTV client to play content associated therewith. If desired, the proxy server can request of the content server a list of options, and the list is returned to the proxy server. Asset information may be requested by the IPTV client and returned thereto by the content server. Also, a service login received from the second device may be sent by the IPTV client to the content server and a service token returned to the IPTV client device in response. When a list of contents is sent to the second device, URL of contents may be removed from the list. The second device requests a content using a unique identifier of the content, the proxy server or the management server may use the unique identifier of the content to locate a corresponding URL of the content. In this way, the second device may not obtain the URL of a content so that unauthorized distributions of content are effectively prevented.

According to an embodiment of the present invention, a consumer electronic device (CE) may act as a second device, which includes a housing holding a display, a network interface, and a processor controlling the display and communicating with the Internet through the network interface. An input device communicates with the processor. The processor executing logic includes sending login information to a proxy server, and receiving from the proxy server, responsive to reception thereby of correct login information, a local IP address of an IPTV client. The processor uses the local IPTV address to access the IPTV client directly to request information about the IPTV client, sending the information about the IPTV client to the proxy server. Responsive to sending the information about the IPTV client to the proxy server, the processor receives content information, presenting it on the display from which a user can select a selected content. The processor commands the IPTV client to play the selected content.

According to an embodiment of the present invention, a proxy server assembly includes at least one processor and at least one network interface communicating with the processor to establish communication between the processor and a wide area network.

According to an embodiment of the present invention, at least one computer readable storage medium is accessible to the processor and bears logic causing the processor to receive login information from a second device. Responsive to a determination that the login information is correct, the server sends to the second device a local IP address of an IPTV client associated with the login information. The server receives from the second device information about the IPTV client requesting a list of services available to the IPTV client from at least one content server and sends a request for the list of services to a management server. The proxy server receives from the management server the list and sends it to the second device for presentation of information on a video display thereof. The proxy server then receives from the second device a request for a software asset and responsive to the request for the software asset, requests a service login of the content server. The proxy server receives back from the content server a list of assets or categories or services and sends the list to the second device. In this way, the list can be presented on a video display of the second device so that a user can navigate to enter a selection to command the IPTV client to play the selection.

According to an embodiment of the present invention, a first device is connected with a plurality of electronic devices. A second device may transmit control commands to the first device using a communication network or internet to control the plurality of electronic devices.

Referring to FIG. 1, an IPTV system may include a first device such as a client consumer electronics device 12, a second device such as another consumer electronics device 38, an electronic device 29 connected with the first device, a management server 30, a proxy server 34, and a content server 32. Each of the above devices and servers may have both a wired communication interface and a wireless communication interface.

The client consumer electronics device (CE) 12 such as a TV, game player, video disk player, camera, digital clock radio, mobile telephone, personal digital assistant, laptop computer, etc. includes a portable lightweight plastic housing 14 bearing a digital processor 16. The processor 16 can control a visual display 18 and an audible display 20 such as one or more speakers. The client consumer electronics has a unique identifier that, without other means, is able to identify the client consumer electronics within the IPTV system. The unique identifier may be assigned by a manufacturer or assigned by the management server when the client consumer electronics is registered in the IPTV system.

To undertake present principles, the processor 16 may access one or more computer readable storage media 22 such as but not limited to RAM-based storage (e.g., a chip implementing dynamic random access memory (DRAM) or flash memory or disk-based-storage. Software code implementing present logic executable by the CE device 12 may also be stored on one of the memories shown to undertake present principles.

The processor 16 can receive user input signals from various input devices including a remote control device 24, a point and click device such as a mouse, a keypad, etc. A TV tuner 26 may be provided in some implementations particularly when the CE device is embodied by a TV to receive TV signals from a source such as a set-top box, satellite receiver, cable head end, terrestrial TV signal antenna, etc. Signals from the tuner 26 are sent to the processor 16 for presentation on the display 18 and speakers 20.

As shown in FIG. 1, a network interface 28 such as a wired or wireless modem or wireless telephony transceiver communicates with the processor 16 to provide connectivity to a wide area network such as the Internet. Double arrows in FIG. 1 indicate network communication between components over wired and/or wireless links. In this way, the client device 12 can communicate with a management server 30 on the Internet and with one or more content servers 32, also on the Internet and communicating with the management server 30.

If desired, each content server 32 may be associated with a respective proxy server 34 which interfaces the content server 32 with the device 12. The servers 30, 32, 34 have respective processors 30a, 32a, 34a accessing respective nontransitory computer readable storage media 30b, 32b, 34b which may be, without limitation, disk-based and/or solid state storage. The servers communicate with a wide area network such as the Internet via respective network interfaces 30c, 32c, 34c. It is to be understood in view of disclosure below that the CE device 12 particularly when implemented by a non-PC device such as a TV or game console or camera can communicate only with the management server 30 and with content servers 32 that appear on a service list provided to the processor 16 by the management server 30, with the service list not being modifiable by the processor 16.

The electronic device is connected with the first device 12 using a cable such as a 1394 cable or a HDMI cable or using a wireless communication interface such as infrared signals. The electronic device may be a digital video recorder, a Blu-ray player, a game player, an audio amplifier, or an air conditioner. Storage may be any suitable electronic storage, such as RAM, ROM, EEPROM, or other storage medium, or cloud-based storage using local or remote storage via a network, such as storage at a remote server.

A second device 36 may be another consumer electronics device. The second device 36 may be another TV, game player, video disk player, camera, digital clock radio, mobile telephone, personal digital assistant, laptop computer, etc. The second device 36 with a housing 38 bears a digital processor 40 controlling a visual display 42 and an audible display 44 such as one or more speakers. To undertake present principles, the second or control processor 40 may access one or more computer readable storage media 46 such as but not limited to RAM-based storage (e.g., a chip implementing dynamic random access memory (DRAM) or flash memory or disk-based-storage. Software code implementing present logic executable by the second or control device 36 may also be stored on one of the memories shown to undertake present principles. Further, the second or control processor 40 can receive user input signals from various input devices 48 including a point and click device such as a mouse, a keypad, etc. A network interface 50 such as a wired or wireless modem or wireless telephony transceiver communicates with the processor 40 to provide connectivity to a wide area network such as the Internet.

FIG. 2 shows an example embodiment of present principles for enabling a user to use a second device 36 to browse assets and select one to have a first device 12 such as a main IPTV client play the content (the IPTV client is also referred to as IPTV client device and/or IPTV device and/or IPTV herein). FIG. 2 assumes that the user has already created an account with the management server 30 and has affiliated the main IPTV device with that account. In general, a user loads the web application in the second device and logs into their user account, which may be the same account used for device registration. Once logged in, a list of compatible IPTV devices is presented. After the user selects a device, a list of services that the device is entitled to is provided. The user browses the services and their content, in his/her preferred language, on the second device as though it is an actual IPTV device such as the first device. Similar transactions, like video rentals or home shopping purchases, can also be made on the second device. Standard IPTV system interaction with service providers occurs on the proxy server, hence creating a firewall between the second device and content providers. Additional navigation features, like hyper-linked text which will open a new window and the management of premium services from a single location, provide better user experience in this IPTV system.

When a piece of content is selected, it may be sent to the IPTV for command execution (i.e., playback) in the form of a reference id which is used by the IPTV to retrieve content information. By eliminating the presence of the content URL on the second device, the risk of leaking major proprietary information which could result in huge losses is reduced. During the time of playback, the user can continue to browse for other content and queue it for future playback. The IPTV needs to be addressable by the second device to perform playback, which is the case when both devices are on the same local network. The user can also switch devices and resume playback on a different device such as the electronic device 19 in FIG. 1 by going to the recently viewed list and selecting the last video played after switching control to that device.

A detailed description of each state in FIG. 2 is provided as follows.

At state 52 a user turns on the first device 12, hereafter referred to as the "IPTV client" for convenience. At state 54 the IPTV client sends login information including, e.g., user name and password to the management server 30, which at state 56 returns to the IPTV client an IPTV session token, that may be subsequently presented by the IPTV client device to a participating content server 32 to obtain content from that server. Also, the management server 30 stores the local location (IP address or IP address and port number) of the IPTV client device 12.

At state 58, the user instantiates an IPTV client control utility on the second device 36. The utility executed on the second device 36, at state 60, sends a request to the proxy server 34, which returns (62) a response in a suitable language, such as hypertext markup language (HTML) with JavaScript for the second device 36 to execute in accordance with description below. This JavaScript makes asynchronous JavaScript and extended markup language (XML) (AJAX) calls to the proxy server and to the IPTV client device to obtain information to control the IPTV client device.

With more specificity, at state 64 using the JavaScript, or other suitable scripting language, received from the proxy server 34 the second device 36 prompts the user to input to the second device 36 the account login information, including, e.g., account information that the IPTV client provided to the management server 30 at 54. Thus, the servers 30, 32, 34 communicate necessary account information between them as needed to realize present principles.

At state 66 the proxy server 34, responsive to a correct user name and password from the second device 36, returns information about all IPTV clients 12 that are affiliated with the user account, including their local IP addresses which were stored by the management server 30 after login at 54 (and subsequently provided to the proxy server 34).

When the user inputs to the second device 36 at state 68 a selected IPTV client (in this example, the IPTV client device 12) to use with the second device, the second device 36, using the local IP address returned at state 66, accesses the IPTV client device 12 directly. The second device 36 requests device information about the IPTV client device 12 at state 70, including language information, rating information, digital rights management (DRM) information, etc. as desired, which information is returned from the IPTV client device 12 to the second device 36 at state 72. Since the second device 36 knows the IP address of the IPTV client device 12 and consequently communicates directly with the IPTV client device 12, the second device 36 communicates using a local web address of the IPTV client device 12 that need not be globally addressable, and may so communicate as long as the second device 36 and IPTV client device 12 are on the same local network.

At state 74 the second device 36 sends the client information received at state 72 to the proxy server 34, requesting a list of services available to the IPTV client device 12 from one or more of the content servers 32. The proxy server 34 relays the request for a list of services at state 76 to the management server 30, which returns the requested service list at state 78 to the proxy server 34. The proxy server 34 in turn sends the services list to the second device 36 at state 80 for presentation of available services on, e.g., the second device display 42.

State 82 indicates that a user can input (using, e.g., the second device input device 48) a selection of a service on the list that was returned to the second device at state 80. In response, the second device 36, at state 84, sends a request for a list of content and categories to the proxy server 34 along with a service session token that the second device may have received from the content server 32 via the management server 30.

Responsive to the request, at state 86 the proxy server logs into the service at state 86 of the content server 32 providing the selected service. At state 88 the content server 32 provides to the proxy server 34 a service session token for the particular content server 34. State 90 indicates that if desired the proxy server 34 may also request a list of content and categories of the content server 32 and the list is returned at state 92 in, a suitable language e.g., extended markup language (XML) format to the proxy server 34, which relays the assets, categories, services, etc. available for selection to the second device 36 at state 94. When the list of assets or the list of options is provided to the second device, the URL associated with each asset or options are removed. A reference ID is added to the list for each asset and options. The second device requests a particular asset or option by using the reference ID. In this way, the second device may not obtain any URL of the assets or options.

The content available for selection is presented on the second device display 42 so that the user can navigate (96) the display to enter (98) a selection. Responsive to the selection the second device 36 at state 98 sends a command to the IPTV client 12 to play the selection. At state 100 the IPTV client 12 then requests service information of the management server 30 information about the service the selected asset is in, logging in to the service if required. The requested information is returned from the management server 30 to the IPTV client 12 at state 102, and when the IPTV client 12 receives the asset information it plays the asset at state 116. Note that if the IPTV client is already playing content the new content commanded to be played by the second device is placed in a queue in the IPTV client and played when the current content completes.

Note further that the second device may command the IPTV client to play content by sending to the IPTV client over the home network commands coded as if they were sent from an infrared remote control (IR RC), specifically for example the commands may be in Sony® Infrared Remote Control System (SIRCS) protocol. The second device may transmit command signals to the IPTV client to control the electronic device 29.

As shown in FIG. 2, if desired, temporally between states 102 and 116 a series of messages may be exchanged between the IPTV client 12 and the content server 32. For example, a request for content information may be made (104) by the IPTV client 12 and returned (106) by the content server 32. The above-described logging into the service may be relayed by the IPTV client 12 to the content server 32 at state 108 and a service session token returned to the IPTV client at state 110 along with the before-mentioned asset information. Also, a request of content information may be made (112) and a playlist returned to (114) the IPTV client device 12.

The JavaScript/HTML software that is downloaded at state 62 can be make available to all electronic vendors who wish their users to be able to navigate, browse, and search IPTV content on a second device.

The following situations illustrate some scenarios where the second device complements the IPTV's shortcomings, hence providing better user experience for the IPTV user. For example, a group of friends is watching video clips on an IPTV. Each of them are browsing content on their own Second Display and queuing up selections. In another example, someone is looking for content on a particular subject. They are able to quickly type in search terms using their second device even when those terms contain characters not supported by their IPTV. In another example, a man is watching the end of a ball game on the IPTV while his wife uses a Second Display to select a movie for them to watch when the game ends. In another example, a user may be away from an IPTV, but the user may use a smart phone as the second device to browse contents and select a preferable content to be played on the IPTV device.

In the above-identified situations, using a second device can provide many benefits, such as:
Browsing in own language without disturbing the big screen
Ease of data entry in a language not supported by the IPTV
On-device service affiliation for premium services like Netflix
Cross-device playback and resume from a recently viewed list
Social sharing of content to enhance content proliferation
Management of subscription-based services from a single location
Browsing and queue management on the move
One-click Customer service without the need of entering personal or device information
Quick access to relevant device specifications and manuals
Hyper-linked text in forms directs users to informational sites
Content Queue across devices
Advertisement revenue through Second display usage The second device, also referred to as a secondary device and/or a second display device and/or second display, herein, performs manipulating functionality, such as searching, playback, pause, stop, browsing and displaying so as to provide an enhanced user experience of the IPTV without adding to the hardware costs of the unit, making data entry easy and allows users to browse content on the side. IPTV is also a global solution which connects various IPTVs together in a cohesive manner through its potential of initiating playback across devices and also provides the highest level of customer service to users through its one-click customer service feature, where users do not even need to provide any device information which can be difficult to retrieve in the event of a device breakdown.

Figure 3:
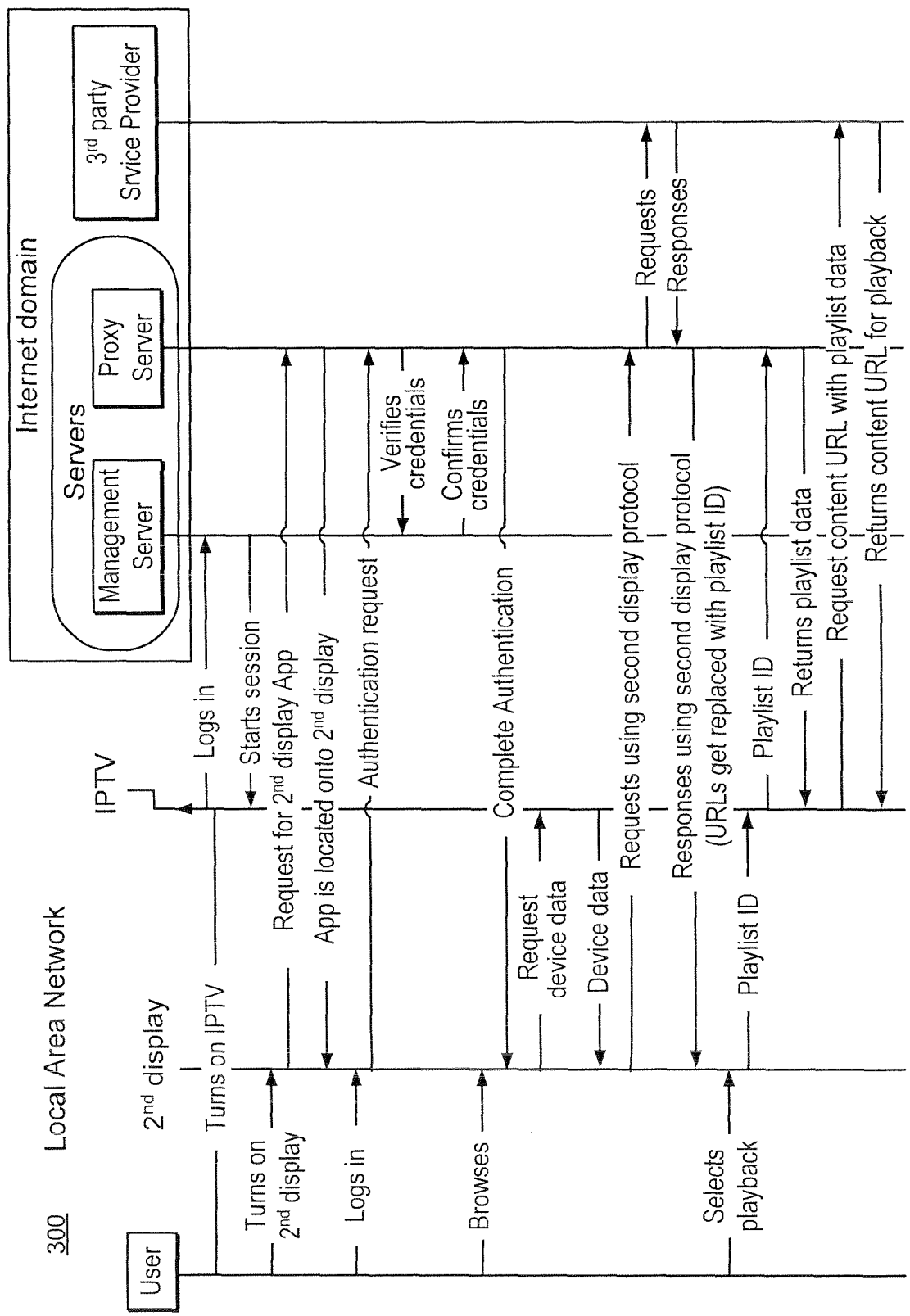
FIG. 3 shows a schematic representation of an embodiment of the present invention.

FIG. 3 shows a schematic representation 300 of an embodiment in which the present invention finds ready application. First a user turns on an IPTV client. After the user logs in on IPTV into the manager server using the device credential, a session is started. Then the user turns on the second display device, and requests for a second display application to proxy server (this can be a remote or local server). The application (native or interpreted application) is loaded onto second display. Then the user logs into the application using account information, which is the same account used for IPTV to log in as described above (however, this is not the same account credential). An authentication request is sent from the second display to the proxy server. The proxy server verifies credentials with the management server, and then the management server confirms credentials with the proxy server. So that authentication is completed.

Then the user browses an Internet video link (IVL). After that, the device data is requested from the second display device and then the requested device data is sent from IPTV client device to the second display device. The second display device sends a request using second display protocol to the proxy server, and then the proxy server requests to service provider, and the service provider responds. The proxy server responds using a second display protocol to the second display with the associated URL replaced with playlist ID.

After the user selects playback, the playlist ID is sent from the second display to the IPTV client device. Then the playlist ID is sent from the IPTV client device to the proxy server, and playlist data is returned from the proxy server to the IPTV client device. The IPTV client device requests a content Uniform Resource Locator (URL) with playlist data of the service provider, and then the service provider returns the content URL for playback to the IPTV client device.

Figure 4:
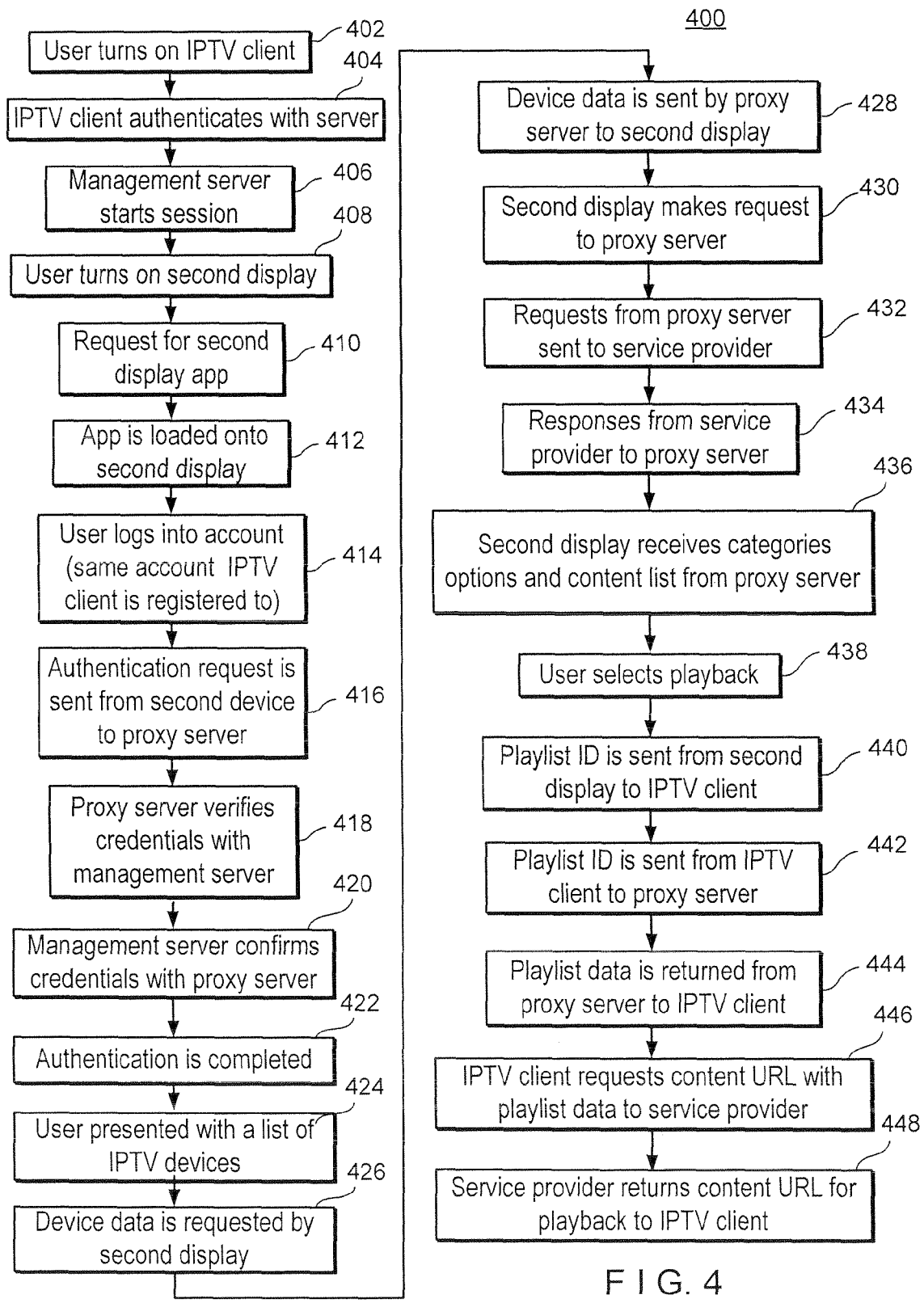
FIG. 4 shows a flow chart of processing steps according to an embodiment of the present invention.

FIG. 4 shows a flow chart 400 of processing steps according to the embodiment of FIG. 3.

The process begins in step 402 in which the user turns on an IPTV client device. After the IPTV client device is authenticated with the server, as shown in step 404, the management server starts the session in step 406. Then in step 408 the user turns on the second display device, and sends a request for a second display application to a proxy server, as shown in step 410. The second display application, which may be for example a web application, is loaded onto the second display device, as shown in step 412. In step 414 the user logs into the account, which is the account used for the IPTV client to log in as described in step 404. In step 416 an authentication request is sent from the second display to the proxy server. The proxy server could be a local server or remote server. In step 418 the proxy server verifies the credentials of the IPTV client with the management server, and then in step 420 the management server confirms the credentials with the proxy server. In step 422 authentication is completed.

In step 424 the user is presented a list of IPTV devices affiliated, or associated with, the user's account. In step 426 when a user selects a particular IPTV device to communicate with, an application program interface (API) is sent to the selected IPTV device, device data, describing the second display is requested by the second display device and in step 428 the requested device data is sent by the proxy server to the second display device. This information may include information specific to the IPTV device such as content rating permitted by that device, language, etc. In an embodiment in which the user has already selected an IPTV device in a previous session, an API may be sent to that IPTV device to obtain device information without the user making a request. Also, according to an embodiment of the present invention, the user may set a particular IPTV device as the default device in a list of IPTV devices. In step 430 the second display sends a request using an API call to the proxy server for options, categories and content list, and then in step 432 the proxy server in turn requests them from the service provider and the service provider responds, with options, categories and content list, as shown in step 434. In step 436 the second display device receives categories, options and a content list from the proxy server and displays them to the user. Alternatively, the proxy server may send to the second display the playlist ID associated with the URL to replace that URL with the playlist ID. Alternatively, the service provider may permit, in some cases, that the URL be sent to the second display device. For example, the second display may have a secure application, and the service provider may allow a second display with a secure application to receive the URL. Thus, the content URL may be transmitted to the IPTV device for playback, rather than having the IPTV device retrieve the data from the server.

In step 438 the user selects content for playback and a playlist is created for that content and stored in the proxy server. Then in step 440 the playlist ID is sent from the second display to the IPTV client. In step 442 the playlist ID is sent from IPTV client to the proxy server, and playlist data is returned from the proxy server to IPTV client in step 444. In step 446 the IPTV client requests content at the URL associated with playlist data to the service provider, and then in step 448 the service provider returns content at that URL for playback to the IPTV client. Alternatively, the proxy server may store the URL content and thus, return the URL content to the IPTV client device without the need to request the content at the URL associated with the playlist data from the service provider. Thus, when the proxy server stores the URL, step 446 is not used, rather, once the IPTV client device obtains the URL, the IPTV client device can start playback.

According to an embodiment of the present invention, pause and resume features are accessed using different IPTV device platforms. (Typically these functions work for the same platform which recognizes the signal, which has limitations, such as requiring a cable box at each playback device.)

The ability to pause and resume playback of media content on a local network across different IPTV devices is implemented here by creation of a system that provides communication between different playback devices.

Embodiments of the present invention do not require additional equipment at each device and instead uses existing IPTV devices for pause and playback functionality.

In one embodiment, the user will choose to resume playback of content using the same IPTV device. For example, a user may be watching content on an IPTV device in their home and decide to pause the content to answer the phone. At a later time, the user may wish to resume watching the content on the same or a different IPTV device.

The following sequence describes the resume feature in content playback with an IPTV device and a second display device. The process starts with the IPTV device playing an asset with the identification of that asset (asset ID) from a list of content provided by an authorized service provider.

The user pauses the asset playback which issues a command or instruction, which includes the asset ID and playback offset, to the service provider along with the asset ID and pause time. It is also an embodiment of the present invention that the user may also stop the asset playback, which similarly, issues a command or instruction that includes the asset ID and playback offset to the service provider along with the asset ID and stop time. Thus, a user may either pause the asset playback or stop the asset playback depending on the desired action. A user can turn on a second display (e.g., smart phone, Sony Ericsson Xperian®, Droid®, or other display device) and browse the assets list on that second display device, which may also display associated content.

When the user selects the same asset ID and/or associated content to be displayed on the primary IPTV device and also displayed on the temporarily paired IPTV device, the primary IPTV device makes a command or instruction, which may include the asset ID, to retrieve all the necessary asset information, such as a playback offset, to make a playback request. If the requested asset exists in the server and contains a pause time, the same asset and pause time are returned. The primary IPTV device then resumes playback of the same asset.

In another embodiment, the user can choose to resume playback on a different IPTV device. For example, a user may have several IPTV devices in their home, each in a different room. The user may start watching media content in one room, for example, the living room, and then decide to move to the kitchen or the bedroom before finishing viewing the content on a second device, which may be either another IPTV device or a display unit (i.e., the second display). By issuing a pause command while watching the media content in the living room, on a first IPTV device, the user may move to the kitchen and finish watching the media content on a second IPTV device. Alternatively, when the user pauses or stops the asset playback on the first IPTV device, the command or instruction may be sent to a second IPTV device directly. The command or instruction includes the asset ID and playback offset.

In an embodiment in which the user selects the same asset ID to play, the one or more first IPTV devices make an instruction or command, which may include the asset ID, to retrieve all the necessary asset information, such as a playback offset, to make a playback request. If the requested asset exists in the server and contains a pause time or playback offset, the asset and pause time or playback offset are returned to the commanding IPTV device. The IPTV device then resumes playback of the same asset.

Figure 5:
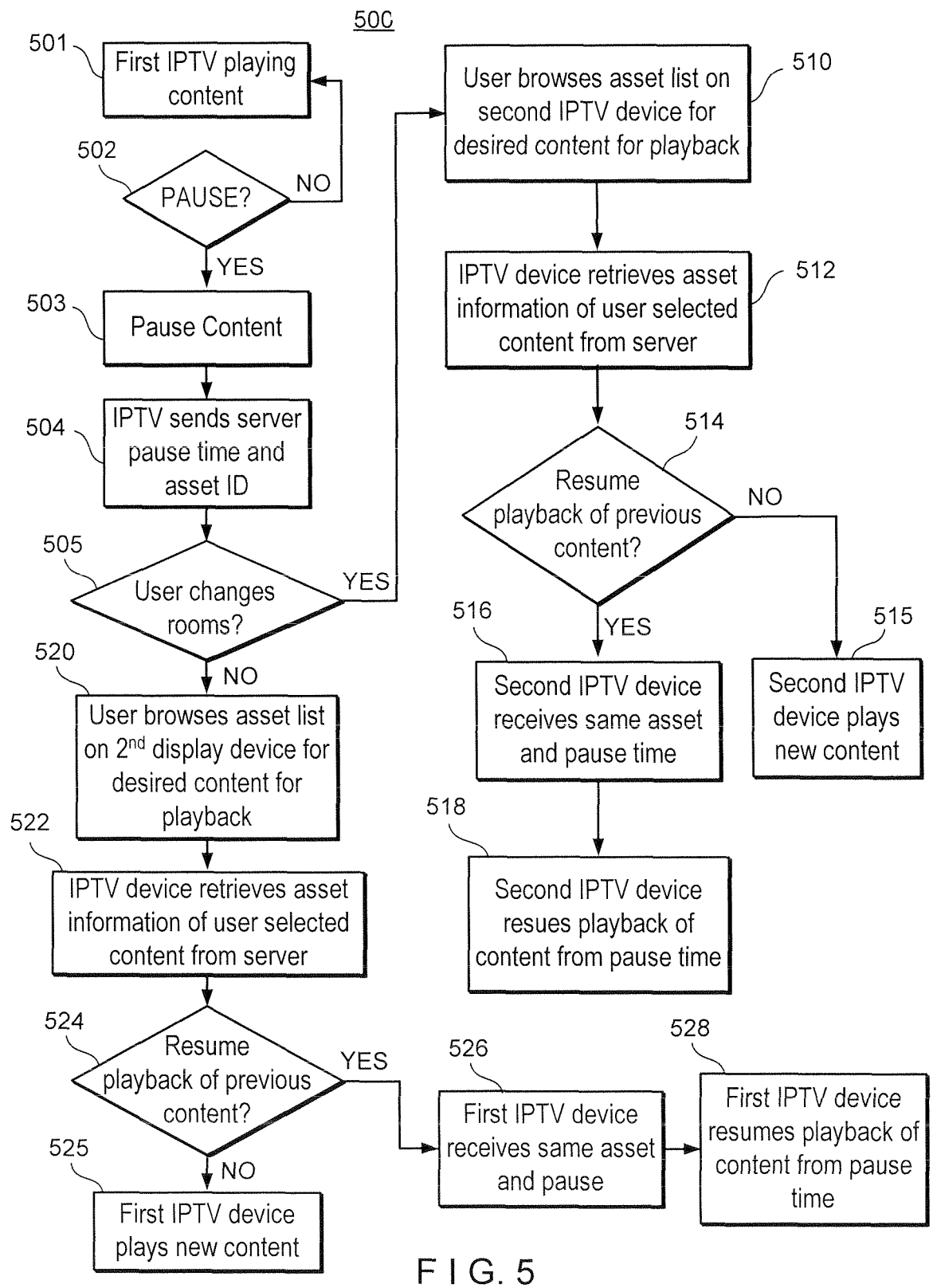
FIG. 5 illustrates an example of steps that provides content to be displayed by resuming play using more than one IPTV device, according to an embodiment of the present invention.

A specific example of an embodiment of the present invention is described in relation to FIG. 5. Step 501 of FIG. 5 shows a first IPTV device playing content. The content may be a movie, a movie preview, audio data, video data or audio-video data, etc. The first IPTV device may be in a user's home, and more specifically in a user's living room, bedroom, kitchen, bathroom, etc. When the user wishes to stop watching the content, he or she may initiate a pause function.

At step 502, the user may pause the playback of the content on the first IPTV device. If the user wishes to pause the content, the process reaches step 503 shows that the first IPTV device is paused and the process reaches step 504, which shows that the first IPTV device sends the server an asset ID and a pause time. For example the first IPTV device may send the server the asset ID and pause time using a command or instruction, which includes the asset ID and playback offset. The asset ID is an identifier of the content and the pause time and playback offset indicates where in the playback of the content the content was paused. Alternatively, the pause time/offset can also be sent from the first IPTV device to the second display device or a secondary device (the secondary device may or may not be an IPTV device) rather than sending the pause time/offset to the server. The second display device and/or secondary device can then forward the pause time/offset to another targeted or identified device for resuming playback. If the device is not paused at Step 502, the process returns to step 501, which shows that the content continues to play on the first IPTV device.

The user may wish to change rooms before deciding to resume watching content on a second IPTV device as shown at step 505. Alternatively, the user may wish to view the content on a second IPTV device in the same room. If the user changes rooms or prefers to view the content on a second IPTV device, the process proceeds according to "yes" line, which shows that step 510 is reached, where the user may decide to watch content on a second IPTV device. If the user does not wish to change rooms, the process proceeds to step 520. As stated previously, the user may have a second IPTV device in the first room from which he may decide to watch media content.

When the process reaches step 510, the user browses an asset list showing available media content on the second IPTV device. Alternatively, the user may use the second display device and/or the secondary device to browse the asset list showing available media content. The second display device and/or secondary device may also be used to select media for playback, which can be displayed on the second IPTV device. Once the user selects media for playback, step 512 shows that the second IPTV device retrieves the selected content and asset information from the server.

Step 514 of the process shows a determination of whether the user has selected content that was previously paused. If the user does not wish to resume playback of previous content, the process proceeds to step 515, in which the server does not return a pause time, and the second IPTV device plays the new content, typically from the beginning.

If it is determined that the user has requested playback of previously paused content, the process proceeds to step 516, which shows that the server returns asset information indicating the pause time. The determination of whether the content was previously paused may be made by the presence of a pause time in the received information from the server. As shown in step 518, the second IPTV device resumes playback of the content using the pause time to determine a point in the content from which to begin playback (offset time). For example, the second IPTV device may resume playback from the pause time, or from a predefined time before the pause time to refresh the user to where he is in the content's playback.

Accordingly, a first and second IPTV device have the ability to share pause data whether or not the devices are on the same local network, or whether or not the devices are addressable to each other, by having both devices communicate with a separate server on the Internet, coordinating their pause data.

Returning to step 505, if the user does not change rooms, nor change the display device, and merely decides to continue watching content at the first IPTV device, the process proceeds according to step 520, in which the user browses the asset list on the first IPTV device for desired content. As shown in step 522, the first IPTV device retrieves asset information of the user selected content from the server.

The process then moves to step 524, which shows a determination is made whether the user has selected content that was previously paused. If the determination is negative, step 525 is reached in which the server returns no pause time, and the first IPTV device plays the new content, typically from the beginning.

If it is determined that the user has requested playback of previously paused content, the process proceeds to step 526 in which the server returns asset information indicating a pause time. The determination of whether the content was previously paused may be made by the presence of a pause time in the received information from the server. As shown in step 528, the first IPTV device resumes playback of the content using the pause time to determine a point in the content from which to begin playback (offset). For example, the second IPTV device may resume playback from the pause time, or from a predefined time before the pause time to refresh the user to where he is in the content's playback.

Another embodiment of the present invention allows playback of a real-time event when the uses moves to a different time zone during the event. This embodiment typically involves a real-time event, such as a concert or sporting event, such as ball game. The user may begin watching the event in one time zone (EST) and then travel to another time zone during the event. The user would like to resume viewing the event, but may also wish to view selected portions that occurred when the user was unable to watch the event, such as the time spent on a plane or train. Thus the pause feature of the present invention permits a user to stop viewing the event, by executing a pause command, travel to another time zone and resume viewing the event, by executing a play back command. The playback can be either from the time of the pause command or resume playing the event in real time in the different time zone. Thus, a user begins viewing an event in one time zone and wishes to resume viewing the event at a later time in a different time zone. The user can stop playing the content of the real time event in one time zone and resume playing the content of the event in a second time zone (assuming the event is still occurring). Thus, the server receives asset identification information from a time zone (e.g., PST) that differs from the time zone (e.g., EST) from which the interruption command is received. The server determines new offset information as a function of the time zone from which the interruption command was received (e.g., EST) and the time zone from which the asset identification information was received (PST), and the server sends content information for execution as a function of the new offset information.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A system comprising:
   an electronic storage device storing:
      a list of IPTV devices associated with each of one or more authenticated users;
      a content list comprising asset identification information for each IPTV device in the list of IPTV devices;
   a network interface for receiving:
      user authentication information;
      asset identification information; and
      an interruption command that includes offset information that represents a time interval from a user initiated pause time of an asset,
      wherein when a server receives an execution command specifying the asset identification information, the server sends content information for execution as a function of the offset information,
      wherein the server sends content identification information so that content is played back starting at a predetermined time before the pause time.

2. The system as in claim 1, further comprising:
   an execution command, associated with a second IPTV device, to initiate play back of the content utilizing the second IPTV device.

3. The system as in claim 2, wherein the server sends content identification information and the second IPTV device plays back content dependent on the offset information.

4. The system as in claim 1, wherein the network interface receives a playback command.

5. The system as in claim 1, wherein the content information is interne content.

6. The system as in claim 1, wherein the electronic storage device stores information that allows a content list associated with a first authenticated user to be made available to a second authenticated user.

7. The system as in claim 1, wherein the offset information is determined from a point in time of main content of the asset.

8. The system as in claim 1, wherein, when the server receives asset identification information from a time zone that differs from the time zone from which the interruption command is received, the server determines new offset information as a function of the time zone from which the interruption command was received and the time zone from which the asset identification information was received, and
   the server sends content information for execution as a function of the new offset information.

9. The system as in claim 8, wherein, when the network interface receives a fast forward command, the server provides content information to a point of the content based on the asset identification information from a time zone.

10. The system as in claim 1, wherein the asset list is an electronic location.

11. The system as in claim 10, wherein the location is a uniform resource locator (URL).

12. The system as in claim 10, wherein the location is a uniform resource identifier (URI).

13. A non-transitory computer-readable medium storing a computer program that when executed on a computer performs processing, the program comprising the steps of:
   receiving a first asset list from a server identifying one or more assets available for playback on a first IPTV device;
   sending an asset selection to the server;
   sending a user initiated interruption command including offset information to the server, the offset information representing a time interval from a pause time of the asset;
   receiving a second asset list from the server identifying one or more assets available for playback on a second IPTV device; and
   sending a playback command to resume play back of the asset available for playback to the server for content to be played back starting at a predetermined time before the pause time.

14. The non-transitory computer-readable medium of claim 13, wherein the one or more assets available for playback on the second IPTV device are available for playback on the first IPTV device.

* * * * *